March 2, 1971 — C. W. GEMPERLÉ — 3,567,558
GELATINE-TRANSFER ENGRAVING MACHINE
Filed May 3, 1968 — 2 Sheets-Sheet 1
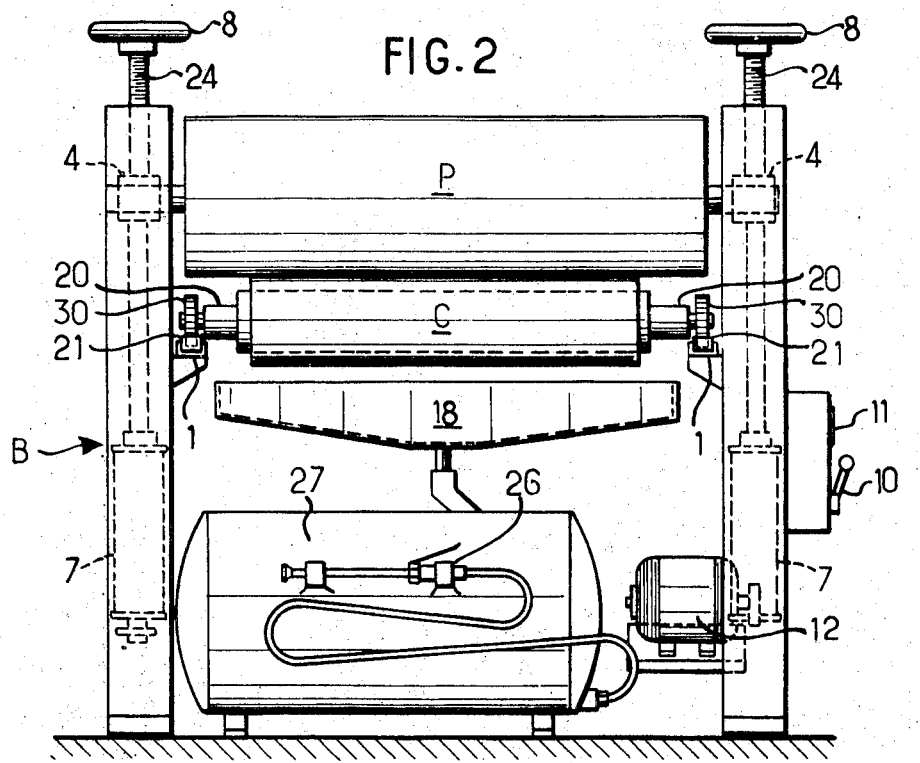
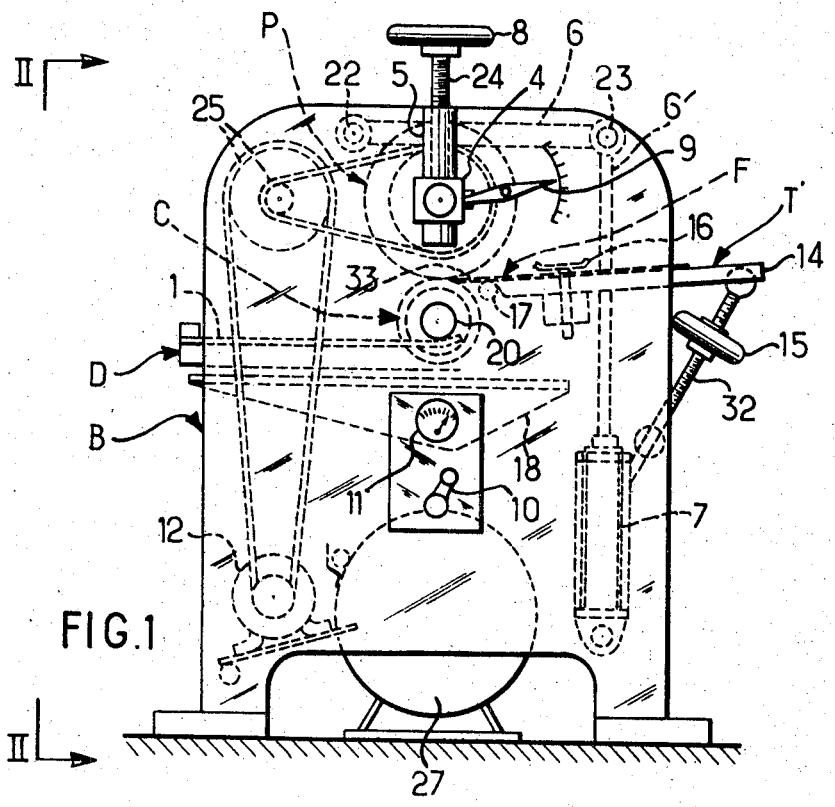

March 2, 1971  C. W. GEMPERLÉ  3,567,558
GELATINE-TRANSFER ENGRAVING MACHINE
Filed May 3, 1968  2 Sheets-Sheet 2
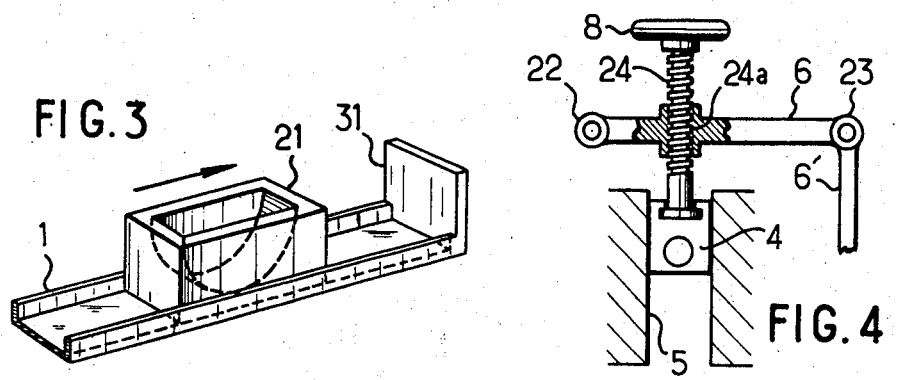
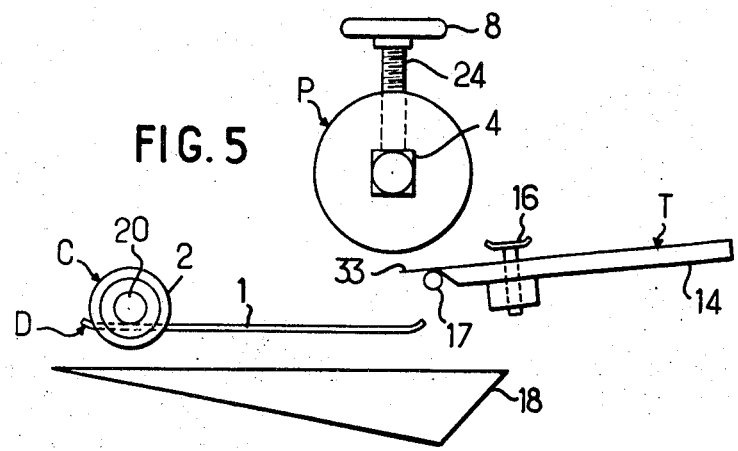
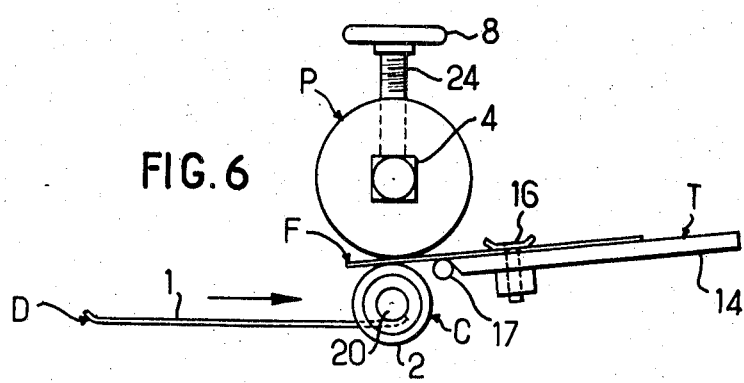
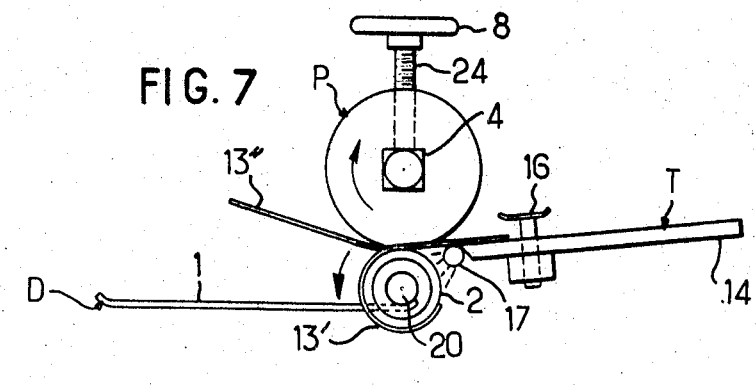

United States Patent Office 3,567,558
Patented Mar. 2, 1971

3,567,558
GELATINE-TRANSFER ENGRAVING MACHINE
Charles Walter Gemperlé, Villefranche-sur-Saone, France, assignor to Gillet Thaon (Societe Anonyme), Paris, France
Filed May 3, 1968, Ser. No. 726,314
Int. Cl. B32b *31/12;* B41l *25/02*
U.S. Cl. 156—555                        17 Claims

ABSTRACT OF THE DISCLOSURE

Apparatus for transferring a layer of exposed gelatine supported on a film of plastic material, especially of polyester, onto a cylinder to be engraved. The machine comprises a rigid frame and bearings supporting a cylinder to be engraved. The bearings are movably mounted transversely on the frame between a predetermined working position and a displaced position for cleaning to a pressure roller adapted to be applied against the cylinder, is supported by bearings mounted in vertical guides arranged vertically in line with the working position of the bearings of the cylinder and pressure-control means are provided for lifting and lowering the pressure roller along the vertical guides and for applying a predetermined pressure from said roller onto the cylinder to be engraved. Driving control means are associated with the pressure roller in order to rotate said roller, and a feed table is intended to receive a layer of light-exposed gelatine carried by a plastic film and to permit the introduction of the film between the cylinder and the pressure roller for the purpose of winding and causing the film to adhere around the cylinder by the driving and pressing action of the pressure roller.

---

The present invention relates to gelatine-transfer engraving machines. It has already been proposed to transfer onto a copper cylinder a previously exposed film of gelatine, that is to say an irradiated film carrying the negative image of the design to be engraved by corrosion.

The method consists essentially of inducing on the one hand a perfect adhesion of the film of gelatine on the copper without creases or unadhered portions, and on the other hand the removal of the support from the gelatine layer.

Various devices are utilized for this purpose. These give satisfaction for the materials in which the support of the gelatine layer is formed by paper. However, the paper support has the disadvantage that its dimensional stability is inadequate. Now, this stability is suitably obtained with supports of plastic film, especially of polyester. However, a satisfactory operation of transfer to a metal cylinder of the layer of gelatine detached from a polyester support presents more difficulties than in the case of a paper support.

The present invention has for its object a machine for transferring to a cylinder to be engraved, a layer of irradiated gelatine carried by a film of any appropriate material, especially of plastic material, this machine making it possible to obtain an excellent performance and being provided with parts and accessories such that uniformity of results is combined with great convenience of utilization, resulting in a substantial economy in labor and time.

A machine according to the invention is especially characterized in that it comprises a rigid frame, bearings intended to carry a cylinder to be engraved and which are movably mounted transversely on the frame between a predetermined working position and a laterally displaced cleaning position. A pressure roller is adapted to be applied against the cylinder to be engraved, and the pressure roller is carried by bearings which are mounted in vertical guides arranged vertically with respect to the working position of the bearings of the cylinder to be engraved. A pressure control is provided for lifting and lowering the pressure roller along the vertical guides and to apply a predetermined pressure of the roller downwards on the clinder to be engraved. A driving control is associated with the pressure roller so as to turn it, and a feed table receives a layer of irradiated gelatine supported by a film, especially of plastic, and permits its introduction between the cylinder to be engraved and the pressure roller for the purpose of its winding and adhesion around the cylinder to be engraved by the driving and pressing action of the pressure roller.

It will be noted that the mounting device of the cylinder to be engraved conveniently permits a preliminary cleaning of this cylinder, its accurate placing in position for the operation of transfer of the design, and an easy withdrawal of the cylinder after transfer, without risk of damage. It will be appreciated that the pressure roller applies a uniform and controlled pressure on the layer-carrying film brought into contact with the cylinder. It will also be noted that the table provides a convenient and accurate positioning of the layer-carrying film and its convenient and accurate introduction between the cylinder and the pressure roller.

According to a further characteristic feature, a tank is arranged underneath the cylinder to be engraved in such manner as to collect the cleaning products from the cylinder to be engraved in the laterally-displaced position. This tank also enables the hot water to be collected which is utilized for watering the cylinder during the operation of the machine.

The pressure control of the pressure roller preferably comprises jacks, the rods of which are articulated on pivoted levers co-operating with the bearings of the pressure roller. The jacks are advantageously of the pneumatic type and are connected in parallel on the same controlled circuit in order to ensure a predetermined and uniform pressure on the cylinder.

In accordance with another particular feature of the invention, the respective positions of the two bearings of the pressure roller can be micrometrically adjusted and are controllable by means of needles moving in front of graduated scales.

In addition, according to the invention, reference marks are provided so as to permit convenient positioning on the table of the layer-carrying film, while electro-magnetic clips are provided to hold the layer-carrying film fixed on the table, means being provided for releasing the clips as soon as the pressure roller is permitted to be driven in rotation.

According to other particular features of the invention, the table is slidable between a withdrawn position for the fixing of the layer-carrying film and a forward position for the engagement of the layer-carrying film between the cylinder to be engraved and the pressure roller, the table being inclinable in an adjustable manner so that it can be adapted to the various diameters of cylinder to be engraved. In addition, the table comprises a front plate for supporting the layer-carrying film up to its contact with the cylinder, and to protect the layer-carrying film from splashing water resulting from the watering of the cylinder.

The present invention has also for its object the products resulting from the transfer operations effected by utilizing the above-mentioned machine.

The objects, characteristic features and advantages of the invention will further be brought out in the description which follows below of one form of embodiment chosen by way of example, reference being made to the accompanying drawings, in which:

FIG. 1 is a view in side elevation of a machine according to the invention;

FIG. 2 is a view of this machine in front elevation, taken along the arrows II—II of FIG. 1;

FIG. 3 is a diagrammatic detail view of one of the half-bearing bushes carrying the cylinder bearings and mounted slidably on slides;

FIG. 4 is a diagrammatic view of the vertical movement control of the bearings of the pressure roller by means of a crank lever system coupled to pneumatic jacks with the interposition of a micrometric adjustment;

FIG. 5 is a diagrammatic view of the machine in a position in which the cylinder to be engraved is in course of cleaning;

FIG. 6 is a view similar to FIG. 5, but in which the cylinder to be engraved is in the working position, the layer-carrying film being in the engaged position between the cylinder to be engraved and the pressure roller; and FIG. 7 is a view similar to those of FIGS. 5 and 6, but showing the machine in course of operation, during which the layer is wound and stuck on the cylinder to be engraved while the supporting film is removed.

In the form of embodiment shown, a machine according to the invention for transferring to a cylinder to be engraved a layer of irradiated gelatine supported by a film of any appropriate nature, especially of plastic material, comprises a rigid frame B, a cylinder to be engraved C, a device D conveniently permitting the previous cleaning of the cylinder C, its accurate placing in position for the operation of transfer of the design and an easy withdrawal without risk of damage to the cylinder C after transfer, a pressure roller P applying a uniform and controlled pressure on a film F carrying the layer of gelatine and brought into contact with the cylinder C, and a table T permitting the convenient and accurate positioning of the carrying film and the convenient and accurate introduction of this latter.

The device D comprises two horizontal slides 1 which each have a U-section (see FIGS. 1, 2 and 5) and which permit the displacement of the cylinder C which is mounted on a mandrel 20. In the position shown in FIG. 5, there can be readily effected the cleaning, de-greasing and scouring of the cylinder C, while a tank 18 enables the solid and/or liquid products utilized for this purpose to be collected.

The mandrel 20 on which the cylinder C is mounted receives at its two extremities two ball-bearings 30. These latter are intended to be fitted into blocks 21 which constitute bearings in the shape of half-bushings and which are adapted to slide along the slides 1, as shown in FIG. 3.

The bearings 21 carrying the cylinder C are thus mounted so as to move along the slides 1 between a predetermined working position (FIGS. 1, 6 and 7) and the separated cleaning position shown in FIG. 5. The predetermined working position is defined by the bearings 21 coming into abutment against an accurate bearing surface 31 (see FIG. 3).

It will be noted that this assembly permits at any moment, and especially in the working position, free rotation of the cylinder C by means of the bearings 30.

The pressure roller P has a diameter considerably greater than that of the cylinder C, for example twice as great. It is preferably made of steel covered with a layer of rubber having an appropriate hardness, for example a Shore hardness of 80.

The pressure roller P is mounted in a pair of bearings 4 each of which can slide on a vertical slide 5 (FIGS. 1, 2 and 4) arranged vertically above each corresponding bearing 21 when the latter is located in the working position against the abutment 31. A rod 24 carrying a hand-wheel 8 is coupled to each bearing 4 so that the rod 24 and the bearing 4 move together in a vertical direction while the rod 24 can rotate about its own axis with respect to the bearing 4. The hand-wheels 8 of the rods 24 permit the adjustment of the parallelism of the generator lines of the pressure roller P with those of the cylinder C to be engraved.

This parallelism can be checked by two pointers 9 travelling over graduated scales, one pointer on each lateral face of the frame B. The rod 24 is threaded and screwed at 24a (see FIG. 4) into the horizontal arm 6 of a pair of lever arms having the horizontal arm 6 and a vertical arm 6′. The horizontal arm 6 is pivotally mounted on a fixed hinge 22 on the frame B, while the arm 6′ is freely articulated at 23 on the arm 6. The arm 6′ forms the rod of a double-acting pneumatic jack 7.

With such an arrangement, an upward thrust applied by the jack 7 to the arm 6′ reduces the contact pressure of the pressure roller P and cylinder C. Conversely, a downward pull applied by the jack 7 to the arm 6′ increases this contact pressure. In order that this pressure may be the same on each bearing 4, the two pneumatic jacks 7 are connected in parallel on the same compressed-air circuit, the pressure of which is adjustable by a pressure-reducing valve 10 and is checked by a pressure gauge 11. The pressure roller P is driven in rotation from a motor 12 by means of a transmission 25 of pulleys and belts.

It is the pressure roller P which alone ensures the drive of the film engaged between the roller P and the cylinder C, the latter being able to rotate without any stray friction by means of the bearings 30. This arrangement makes it possible to avoid any accidental slip of the film F on the cylinder C.

The position of the film F can be readily adjusted on the table T by means of appropriate reference marks. This position can be fixed by means of two electromagnetic clamps 16, one on each lateral edge of the film F. In order that the film F always has the same incidence with respect to the assembly constituted by the pressure roller P and the cylinder C, irrespective of the diameter of this latter, the position of the table T with respect to a horizontal plane is adjustable by means of a threaded rod 32 provided with a hand-wheel 15 and coupling the frame B to slides 14, on which the table T is slidably mounted. This movable mounting has the advantage of giving easier access to the table T for laying on it the film F, avoiding any cause of fraying.

The table T comprises on its edge nearest to the cylinder C-roller P assembly, a plate 33 having simultaneously the function of supporting the film F up to its contact with the cylinder C and of protecting the layer of gelatine carried by the film F against projection of hot water coming from the perforated tube 17. The function of the tube 17 is to keep the cylinder C wet during the whole period of transfer of the gelatine layer. The spraying water is collected by the tank 18. In order that the temperature of the spraying water may remain constant, the tube 17 is supplied with hot water by a water heater 27 provided with an adjustable thermostat 26. Good results are generally obtained with an adjustment temperature of the order of 35° C.

A control device is provided in order to ensure the synchronism of the setting in rotation of the pressure roller P, of the lifting of the holding clamps 16 of the film F and of the starting of watering from the tube 17.

With the machine which has just been described, the course of a transfer operation is as follows:

The metal cylinder C is cleaned, de-greased and scoured in the position shown in FIG. 5, after which the cylinder C is given a movement of translation by sliding the bearings 21 along the slides 1 up to the position of working shown in FIG. 6.

The layer-carrying film F is centered on the reference marks on the table T which has been previously moved back by sliding on the slides 14 as far as possible from the center of the machine. The film F is immobilized on the table T by means of the magnetic clamps 16. The table T is then brought back towards the machine by sliding along the slides 14 as far as possible to the centre of the machine.

The pressure roller P is jut under pressure against the cylinder C and the working conditions are regulated by means of the pressure-reducing valve 10 and the handwheels 8.

The edge of the film F is engaged between the cylinder C and the roller P (FIG. 6) and the motor 12 is started up. This starting-up automatically releases the magnetic clamps 16, thus freeing the film F, and puts into operation the watering of the cylinder C by hot water from the tube 17.

The operator grips the extremity of the film F in the position of FIG. 6 and keeps in hand the plastic portion 13″ forming the support of the film, while the layer of gelatine 13′ winds round and becomes stuck on the cylinder 2, as shown in FIG. 7. The motor is stopped when the cylinder 2 is entirely covered by the layer of gelatine 13′.

The cylinder C, the pressure roller P and the table T are then brought back to the starting position for a new operation.

It will be appreciated that the invention comprises a machine permitting of satisfactory transfer to a metal cylinder of a layer of irradiated gelatine supported on a film of plastic material, especially of polyester, together with the folowing devices:

A device readily permitting of the previous cleaning of the cylinder on the actual machine.

A device permitting the application and the checking of a predetermined and uniform pressure of the roller on the cylinder.

A device permitting the convenient and precise positioning and fixing of the film carrying the layer of gelatine on a sliding table.

A device permitting the introduction of the film between the cylinder and the pressure roller at a constant incidence, irrespective of the diameter of the cylinder.

A device conveniently permitting spraying the cylinder with water at a constant temperature during the transfer operation, without risk of stains on the gelatine layer.

A device for automatically ensuring the starting of the spraying operation and the freeing of the film with respect to the table as soon as the motor actuating the pressure roller is started-up.

The invention is of course not restricted to the form of embodiment described and shown, but includes all its alternative forms.

What I claim is:

1. A machine for transferring a layer of irradiated gelatine supported a film of appropriate material, such as plastic material or the like, onto a cylinder to be engraved, said machine comprising a rigid frame, first bearings intended to carry a cylinder to be engraved, said first bearings being movably mounted transversely on said frame between a predetermined working position and a displaced cleaning position, a pressure roller adapted to be applied against said cylinder, said pressure roller being supported by second bearings mounted in vertical guides disposed vertically in line with the working position of said first bearings, pressure-control means for lifting and lowering said pressure roller along said vertical guides and for applying a predetermined pressure from said roller downwards on said cylinder to be engraved, driving-control means operatively coupled to said pressure roller for rotating said roller, and a feed table adapted to receive a layer of irradiated gelatine supported by a plastic film and to permit the introduction of said film between the cylinder to be engraved and said pressure roller for the purpose of winding and causing said film to adhere around said cylinder by the driving and pressing action of said pressure roller.

2. A machine as claimed in claim 1, and further comprising a tank disposed underneath the cylinder to be engraved so as to collect the cleaning products falling from said cylinder when in the separated cleaning position.

3. A machine as claimed in claim 1, in which said pressure-control means for the pressure roller comprise jacks, the rods of said jacks being articulated on pivoted levers adapted to co-operate with the bearings of said pressure roller.

4. A machine as claimed in claim 3, in which said jacks are pneumatically operated.

5. A machine as claimed in claim 3, in which said jacks are connected in parallel on the same control circuit so as to ensure a pre-determined uniform pressure on said cylinder.

6. A machine as claimed in claim 1, in which the respective positions of the two bearings of said pressure roller are micrometrically adjustable, said positions being indicated by means of pointers moving in front of graduated scales fixed on said frame.

7. A machine as claimed in claim 1, in which reference marks are provided so as to facilitate the positioning of said layer-carrying film on said feed table.

8. A machine as claimed in claim 1, and further comprising electro-magnetic clamps provided for immobilizing the layer-carrying film on said feed table.

9. A machine as claimed in claim 8, and further comprising means for liberating said magnetic clamps as soon as said pressure roller is permitted to be driven in rotation.

10. A machine as claimed in claim 1, in which said feed table is adapted to slide between a withdrawn position for fixing said layer-carrying film and a forward position for engaging said film between the cylinder to be engraved and said pressure roller.

11. A machine as claimed in claim 1, in which said feed table is inclinable in an adjustable manner, so as to be adapted to various diameters of said cylinder to be engraved.

12. A machine as claimed in claim 1, in which said feed table comprises a front plate adapted to support said layer-carrying film up to the contact of said film with said cylinder.

13. A machine as claimed in claim 12, in which the front-plate of said feed table is adapted to protect the layer-carrying film from splashing water due to the watering of said cylinder.

14. A machine as claimed in claim 1, and further comprising spraying means for watering said cylinder with hot water during the transfer operation.

15. A machine as claimed in claim 14, in which said spraying water is subsequently collected in a tank disposed underneath said cylinder.

16. A machine as claimed in claim 14, and further comprising means for setting said spraying means to work when the pressure roller is permitted to be driven in rotation.

17. A machine as claimed in claim 14, and further comprising means for ensuring the synchronization of the starting of rotation of said pressure roller, the lifting of the clamps which immobilize the film and the starting-up of said water-spraying means.

References Cited

UNITED STATES PATENTS

| | | | |
|---|---|---|---|
| 1,211,081 | 1/1917 | Case | 156—555X |
| 1,340,342 | 5/1920 | Horgan | 156—10X |
| 1,719,017 | 7/1929 | Moe et al. | 101—148 |
| 2,158,027 | 5/1939 | Bulford | 101—248 |
| 2,334,963 | 11/1943 | Spinner et al. | 156—555 |
| 2,543,895 | 3/1951 | Corbett | 118—232 |
| 2,818,904 | 1/1958 | Ambrose | 156—555 |
| 2,905,086 | 9/1959 | Zahradnik | 101—248 |
| 3,027,285 | 3/1962 | Eisner et al. | 156—555X |

FOREIGN PATENTS

| | | | |
|---|---|---|---|
| 361,954 | 11/1931 | Great Britain | 156—10 |

BENJAMIN A. BORCHELT, Primary Examiner

J. M. HANLEY, Assistant Examiner

U.S. Cl. X.R.

101—148; 156—215, 230